United States Patent [19]
Millet et al.

[11] Patent Number: 6,125,655
[45] Date of Patent: Oct. 3, 2000

[54] PROCESS FOR PURIFYING AIR BY ADSORBING $CO_2$ AND $H_2O$ IMPURITIES ON CALCINED ALUMINA

[75] Inventors: Cyrille Millet; Philippe Bourgeois; Georges Kraus, all of Paris; Jean-Pierre Gabillard, Auffargis, all of France

[73] Assignee: L'Air Liquide, Societe Anonyme pour l'Etude et l'Exploitation des Procedes Georges Claude, Paris Cedex, France

[21] Appl. No.: 09/204,220

[22] Filed: Dec. 3, 1998

[30] Foreign Application Priority Data

Dec. 8, 1997 [FR] France .................. 97 15490

[51] Int. Cl.[7] ........................... F25J 3/00
[52] U.S. Cl. ............................... 62/641
[58] Field of Search .................. 62/641, 642, 928

[56] References Cited

U.S. PATENT DOCUMENTS

| | | | |
|---|---|---|---|
| 4,717,406 | 1/1988 | Giacobbe | 62/18 |
| 5,012,037 | 4/1991 | Doshi et al. | 585/822 |
| 5,156,657 | 10/1992 | Jain et al. | 55/26 |

*Primary Examiner*—Henry Bennett
*Assistant Examiner*—Malik N. Drake
*Attorney, Agent, or Firm*—Young & Thompson

[57] ABSTRACT

Process for purifying an air flow containing carbon dioxide ($CO_2$) and water vapour, in which at least some of the $CO_2$ and water vapour impurities are removed by adsorbing the impurities on at least one calcined alumina containing at most 10% by weight of at least one alkali or alkaline-earth metal oxide, the adsorption being carried out at a temperature of between $-10°$ C. and $80°$ C.

12 Claims, 4 Drawing Sheets

PROCESS FOR PURIFYING AIR BY ADSORBING $CO_2$ AND $H_2O$ IMPURITIES ON CALCINED ALUMINA

FIELD OF THE INVENTION

The object of the present invention is to provide a process for pretreating or purifying atmospheric air before the said air is cryogenically separated, in particular by cryogenic distillation.

BACKGROUND OF THE INVENTION

It is known that atmospheric air contains compounds which should be removed before the said air is introduced into the heat exchangers of the cold box of an air separation unit, in particular the compounds carbon dioxide ($CO_2$) and water vapour ($H_2O$).

This is because, without such pretreatment of the air to remove its $CO_2$ and water impurities from it, these impurities are found to condense and solidify to form ice when the air is cooled to cryogenic temperature, which may result in problems of clogging the equipment, in particular the heat exchangers, the distillation columns, etc.

Furthermore, it is also common practice to remove the hydrocarbon impurities which may be present in the air in order to prevent them from being concentrated too much in the bottom of the distillation column or columns, and thus to avoid any risk of explosion.

At present, depending on the case, this pretreatment of the air is carried out by a TSA (Temperature Swing Adsorption) process or by a PSA (Pressure Swing Adsorption) process; the term PSA process is intended to mean PSA processes proper, VSA processes (Vacuum Swing Adsorption), VPSA processes and the like.

Conventionally, a TSA process cycle includes the following steps:

a) purifying the air by adsorbing the impurities at superatmospheric pressure and at ambient temperature, b) depressurizing the adsorber to atmospheric pressure or below atmospheric pressure, c) regenerating the adsorbent at atmospheric pressure, in particular using the residual gases or waste gases, typically impure nitrogen which is taken from an air separation unit and is heated to a temperature customarily between 100 and 200° C. using one or more heat exchangers, d) cooling the adsorbent to ambient or sub-ambient temperature, in particular while continuing to introduce into it the residual gas which is output by the air separation unit but has not been heated, e) repressurizing the adsorber with purified air which is output, for example, by a different adsorber which is in the production phase.

For its part, a PSA process cycle customarily includes substantially the same steps a), b) and e), but differs from a TSA process by the absence of heating of the residual gas or gases during the regeneration step (step c)), and therefore the absence of step d) and, in general, a shorter cycle time than in a TSA process.

Devices for pretreating air generally comprise two adsorbers, operating alternately, that is to say one of the adsorbers is in the production phase while the other is in the regeneration phase.

Such TSA processes for purifying air are described, in particular, in the documents U.S. Pat. No. 3,738,084 and FR-A-7725845.

In general, the $CO_2$ and the water vapour are removed on a plurality of beds of adsorbents, namely a first adsorbent intended to preferentially retain water, for example a bed of activated alumina, silica gel or zeolites, and a second bed of adsorbent to preferentially retain $CO_2$, for example a zeolite. The documents U.S. Pat. No. 5,531,808, U.S. Pat. No. 5,587,003 and U.S. Pat. No. 4,233,038 may in particular be cited.

However, obtaining efficient removal of the $CO_2$ and water vapour which are contained in air on one and the same adsorbent bed is no easy matter.

By way of explanation, it is known that water has much greater affinity for adsorbents than $CO_2$.

Therefore, the adsorbent generally retains water more readily than $CO_2$, and so the larger the amount of water adsorbed, the smaller the amount of $CO_2$ adsorbed.

In other words, the selectivity of conventional adsorbents is more favourable to water than to $CO_2$.

Furthermore, to make it possible to regenerate a water-saturated adsorbent, it is common practice to heat this adsorbent to a regeneration temperature in excess of 100° C.

At present, however, very few adsorbents employed on an industrial scale in TSA units have a physico-chemical structure capable of withstanding such hydrothermal treatment for a long period of time; materials of the alumina type belong to this category, while most materials of the zeolite type must be excluded.

In brief, known adsorbents can be classed in two broad categories, namely:

adsorbents which have a high capacity for adsorbing $CO_2$, but only in the absence of any water vapour, that is to say adsorbents which are effective at removing $CO_2$ present in a dry gas, and adsorbents which are intended specifically to remove water vapour and have only little or no affinity for $CO_2$.

In this regard, the document U.S. Pat. No. 5,232,474 may be cited which describes the use of an activated alumina for drying and decarbonating air using a PSA process, in which it is stipulated that the water is retained by an adsorbent bed height of approximately 175 mm, while to adsorb all the $CO_2$ it is necessary to provide a bed height of 1020 mm. It will therefore be understood that the $CO_2$ and the water are not co-adsorbed but are retained by different regions of the adsorbent bed.

SUMMARY OF THE INVENTION

The object of the present invention is therefore to provide a purification process which employs an adsorbent which is capable, if possible simultaneously, of retaining on the same portion of adsorbent bed both the water and the carbon dioxide which may be found in atmospheric air, so as to recover the purified air substantially free of $CO_2$ and/or water vapour, which air may subsequently be sent to an air separation unit.

Furthermore, the fact that the water vapour and the $CO_2$ are adsorbed on the same adsorbent bed makes it possible to reduce the amount of adsorbent which needs to be used, makes it possible to reduce the complexity of the adsorbers by omitting the separating grilles between the various adsorbent beds, and therefore makes it possible to reduce the cost and energy consumption of air separation units.

It has now been found, unexpectedly, that an adsorbent customarily used to remove carbon dioxide from a flow of hydrocarbons, for example olefins, can be advantageously used in a process for decarbonating and drying air before the said air is cryogenically separated; the said adsorbent is an alumina impregnated with an alkali solution and calcined, as described in the documents U.S. Pat. No. 4,433,981 and U.S. Pat. No. 4,493,715.

To this end, it should be emphasized that the object initially set by the documents U.S. Pat. No. 4,433,981 and U.S. Pat. No. 4,493,715 is to avoid isomerization of the hydrocarbon chains during this purification, and not specific removal of $CO_2$; this isomerization problem does not exist in the case of purifying air.

It has in fact been brought to light, unexpectedly, that a calcined alumina can retain the water and carbon dioxide which are present in atmospheric air simultaneously, that is to say on the same adsorbent bed portion, preferably at ambient temperature.

Within the scope of the present invention, the term calcined alumina will be used to mean an adsorbent which is based on activated alumina and is in general obtained from fast dehydration of an aluminium hydroxide, the activated alumina being shaped in the form of granules or beads, for example, the adsorbent being then impregnated with a salt solution and, finally, subjected to drying and subsequent calcining; an adsorbent of this type may furthermore contain silicon oxide ($SiO_2$) in a non-negligible concentration.

It should furthermore be noted that the document EP-A-0766991 describes a process for decarbonating air which employs an adsorbent of the type made up of alumina impregnated with a basic solution having a pH of at least 9, the alumina being subsequently dried. It should be emphasized that this document stipulates that the impregnated, that is to say uncalcined, aluminas have a greater $CO_2$ adsorption capacity than the other adsorbents. Furthermore, this document makes absolutely no mention as to whether or not it is possible to remove the water vapour which may be found in the atmospheric air on the said impregnated alumina.

The object of the present invention is to provide a process for co-adsorbing the $CO_2$ and water vapour which may be found in an atmospheric air flow, in order to make it possible to obtain dried and decarbonated air.

The invention therefore relates to a process for purifying an air flow containing carbon dioxide ($CO_2$) and water vapour, in which at least some of the $CO_2$ and water vapour impurities are removed by adsorbing the impurities on at least one calcined alumina containing at most 10% by weight of at least one alkali or alkaline-earth metal oxide, preferably from 1 to 10 by weight, the said adsorption being carried out at a temperature of between −10° C. and 80° C.

Within the scope of the present invention, the term air is intended to mean not only atmospheric air but also air which has undergone a pretreatment or a modification of the level of one or more of its constituents, for example air enriched or depleted in nitrogen or in oxygen, or air at least partially dried beforehand, it being possible for the air to be collected directly from the atmosphere or, if appropriate, from inside a building or enclosure which may or may not be heated.

Depending on the case, the process of the invention may comprise one or more of the following characteristics:
at least one calcined alumina is obtained by:
 a) impregnating an adsorbent based on activated alumina with at least one solution of a salt of at least one alkali or alkaline-earth metal chosen from Li, Na, K, Mg, Ca, Sr and Ba;
 b) drying an adsorbent based on impregnated alumina obtained in step a) at a temperature of at least 15° C., preferably at least 80° C.;
 c) calcining the adsorbent based on dried alumina obtained in step b) at a temperature of at least 120° C., preferably between 150° C. and 600° C.;

at least one alkali or alkaline-earth metal is selected from calcium, sodium, potassium and mixtures thereof;

the calcined alumina contains from 4 to 10% by weight of alkali or alkaline-earth metal oxide, preferably between 5 and 8% or, depending on the case, at most 5% by weight of alkali or alkaline-earth metal oxide, preferably from 1 to 4%, for example the following metal oxides: $K_2O$, $Na_2O$ and $CaO$;

the calcined alumina particles have a size of between 1 and 5 mm, preferably between 2 and 4 mm;
 it comprises removing the water vapour on at least one calcined alumina;

the $CO_2$ and/or water vapour are removed in at least one adsorber and, preferably, in at least two adsorbers operating alternately;

it is selected from the group formed by TSA and PSA processes;

the operation is carried out at an adsorption pressure of from $10^5$ to $10^7$ Pa, preferably $4 \times 10^5$ Pa to $5 \times 10^6$ Pa;

the operation is carried out at a temperature of from 10° C. to 70° C., preferably from 20° C. to 55° C.;

it comprises at least one step of regenerating the adsorbent at a regeneration temperature ranging from 0° C. to 250° C. approximately, preferably between 70° C. and 200° C.;

it comprises at least one step of cryogenically separating at least some of the purified air, preferably a step of cryogenically distilling the purified air.

BRIEF DESCRIPTION OF THE DRAWINGS

The present invention will now be described in more detail with the aid of examples and with reference to the appended figures, which are given by way of illustration but without implying any limitation.

DETAILED DESCRIPTION OF THE INVENTION

Figure 1:
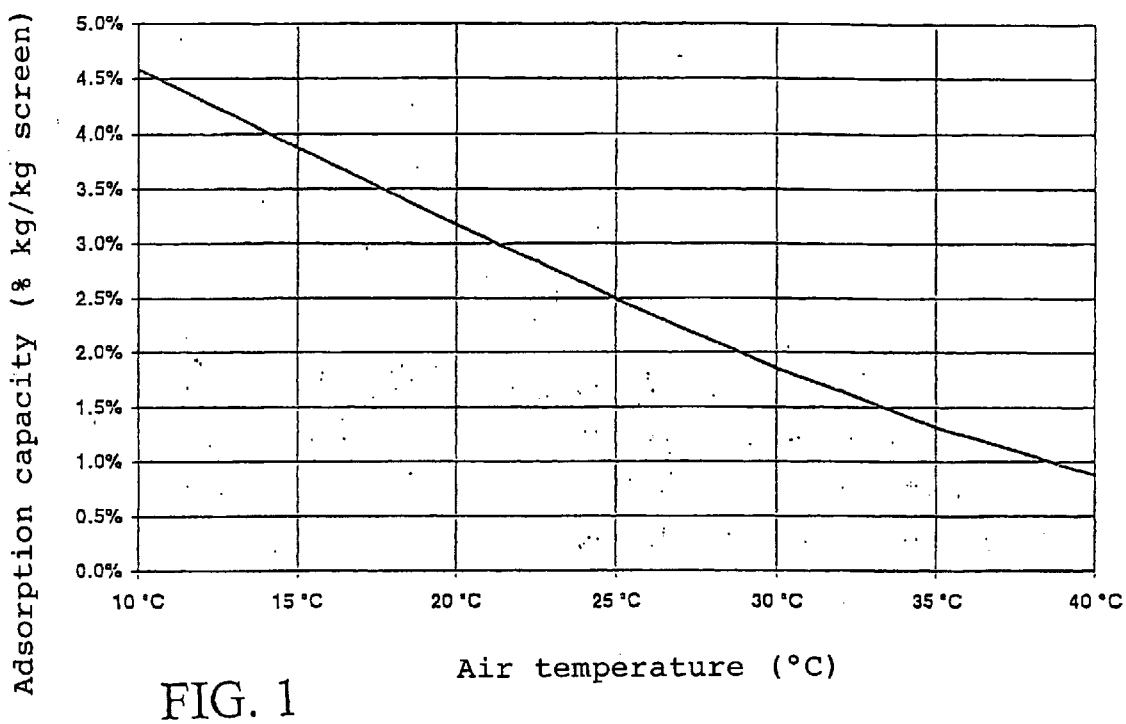
FIG. 1 represents the variation in the carbon dioxide ($CO_2$) adsorption capacity for a conventional type 13X zeolite as a function of the air temperature; the temperature (in ° C.) is given on the abscissa and the adsorption capacity (%) is given on the ordinate.

With reference to FIG. 1, it is immediately apparent that the 13X zeolite has a $CO_2$ adsorption capacity which decreases markedly when the temperature of the air to be decarbonated increases.

However, if it is desired to reduce the investment and energy-consumption costs of air separation units, it is necessary or desirable to eliminate the refrigeration units and the water/gas cooling towers used hitherto.

The consequence of this is that, under these conditions, the air to be purified has a temperature generally of between 30° C. and 40° C., that is to say a temperature at which adsorbents of the zeolite type become very inefficient owing to a very low $CO_2$ adsorption capacity.

Figure 2:
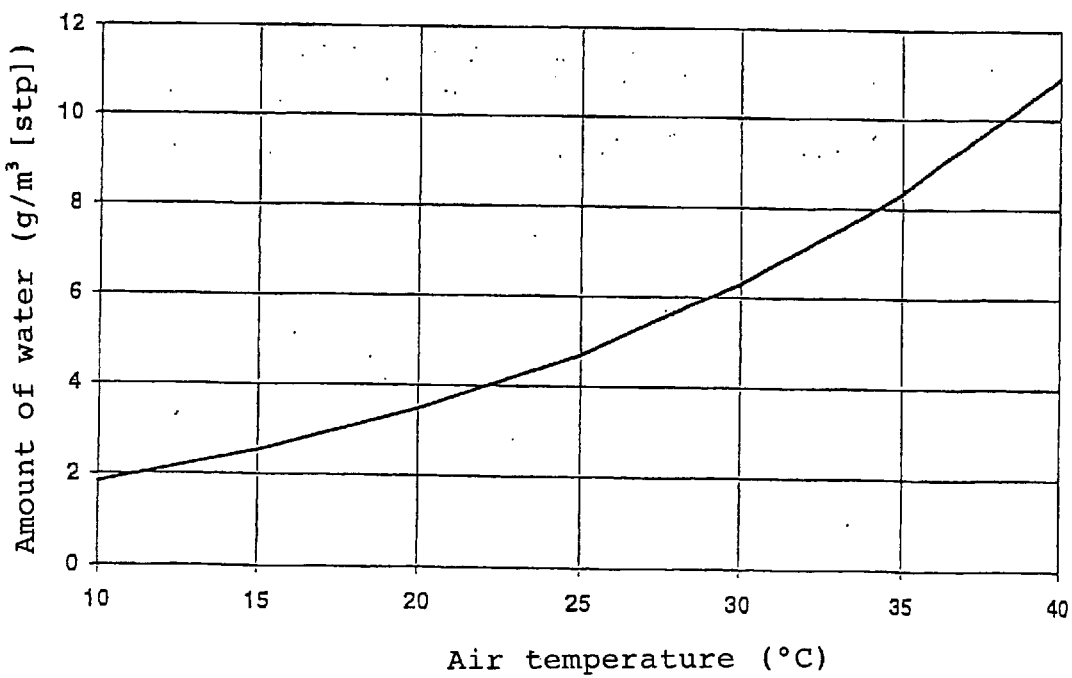
FIG. 2 represents the amount of water contained by air saturated with water vapour at a pressure of $5.5 \times 10^5$ Pa as a function of its temperature; the temperature (in ° C.) of the air is given on the abscissa and the amount of water (in g/m³ [stp]) contained in the air is given on the ordinate.

Furthermore, FIG. 2 represents the amount of water contained by air saturated with water vapour at a pressure of $5.5 \times 10^5$ Pa as a function of its temperature; the temperature (in ° C.) of the air is given on the abscissa and the amount of water (in g/m³ [stp]) contained in the air is given on the ordinate. It is apparent that the amount of water contained by the air saturated with water vapour increases when the temperature of the said air increases.

In view of FIGS. 1 and 2, it will be understood that, when the temperature of the air to be purified increases, it is found that the decarbonation capacity decreases (FIG. 1) and the amount of water to be retained increases (FIG. 2), this increase in the amount of water to be retained having a detrimental effect on proper efficient decarbonation of the air flow, and therefore heightening the decrease in the $CO_2$ adsorption capacity of the adsorbent.

Accordingly, the respective $CO_2$ adsorption capacities of the aforementioned 13X zeolite, of an activated alumina of the conventional type, that is to say one which is uncalcined, and of two calcined aluminas were measured and are given in Table I below.

The calcined aluminas tested are obtained by impregnating an alumina with an alkali metal salt solution, in this case an NaOH solution, then drying and calcining at a temperature in excess of 150° C., so as to obtain a first calcined alumina containing about 2% of sodium oxide ($Na_2O$) and a second calcined alumina containing about 7% by mass of sodium oxide.

The desired mass percentage of sodium oxide is obtained by varying the concentration and the volume of the salt solution; this is done in a manner known to the person skilled in the art.

The experimental tests were carried out in a 300×60 mm column with, as carrier gas, nitrogen at a pressure of 6×10⁵ Pa, at a temperature of about 27° C. and containing about 450 ppm of $CO_2$.

TABLE I

| Adsorbent | $CO_2$ adsorption capacity |
| --- | --- |
| Uncalcined activated alumina | 0.22 mmol/g |
| 13x zeolite | 0.81 mmol/g |
| Calcined alumina (2% $Na_2O$) | 0.44 mmol/g |
| Calcined alumina (7% $Na_2O$) | 1.47 mmol/g |

In view of Table I, it can be seen that the $CO_2$ adsorption capacity of a calcined alumina is greater than that of an uncalcined activated alumina of conventional type.

Furthermore, it can also be seen that increasing the amount of sodium oxide in an alumina makes it possible to increase the $CO_2$ adsorption capacity of this alumina.

Thus, for a calcined alumina containing about 7% of sodium oxide, an adsorption capacity is obtained at ambient temperature (in this case about 27° C.) which is markedly greater than that obtained by means of a conventional 13X zeolite.

However, it will be observed that for a calcined alumina containing only 2% of sodium oxide, the adsorption capacity is less than that of a 13X zeolite.

However, as shown in FIGS. 1 and 2, a 13X zeolite does not permit co-adsorption of the $CO_2$ and the water vapour which may be found in an atmospheric air flow.

In other words, in the simultaneous presence of water vapour and $CO_2$, the co-adsorption capacity of a calcined alumina containing 2% of sodium oxide is greater than that of a 13X zeolite, as explained below.

Figure 3:
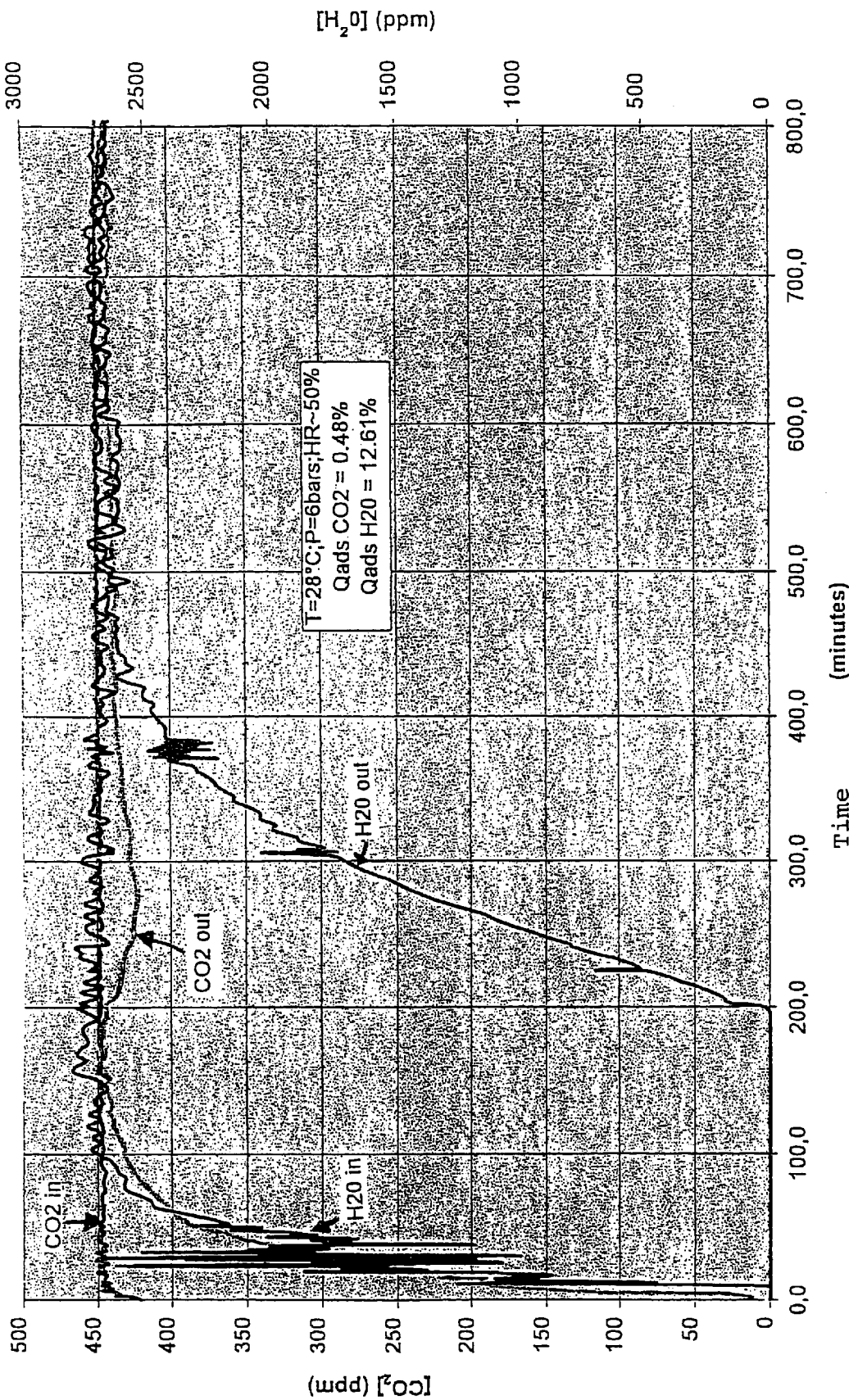
Figure 4:
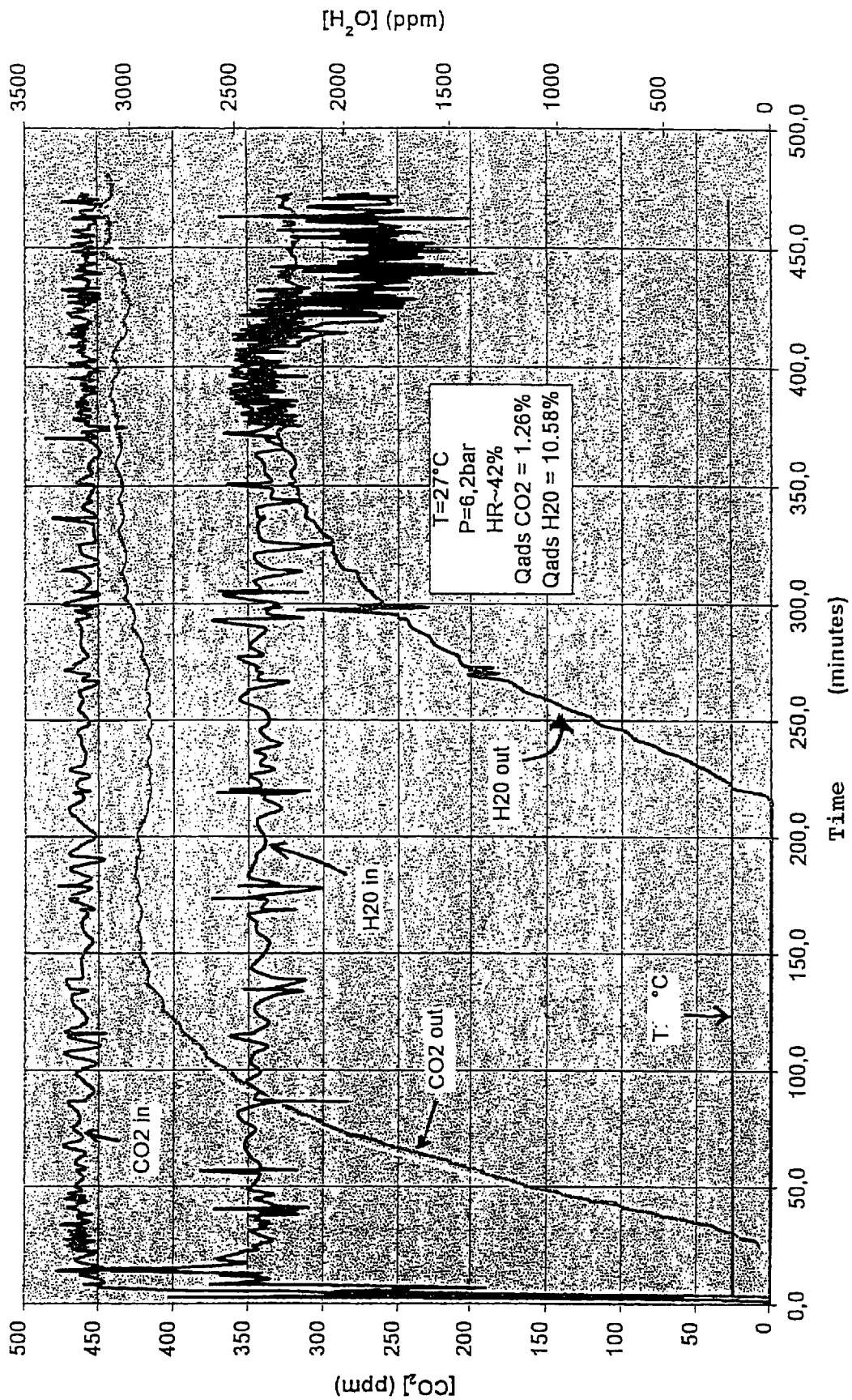
Figure 5:
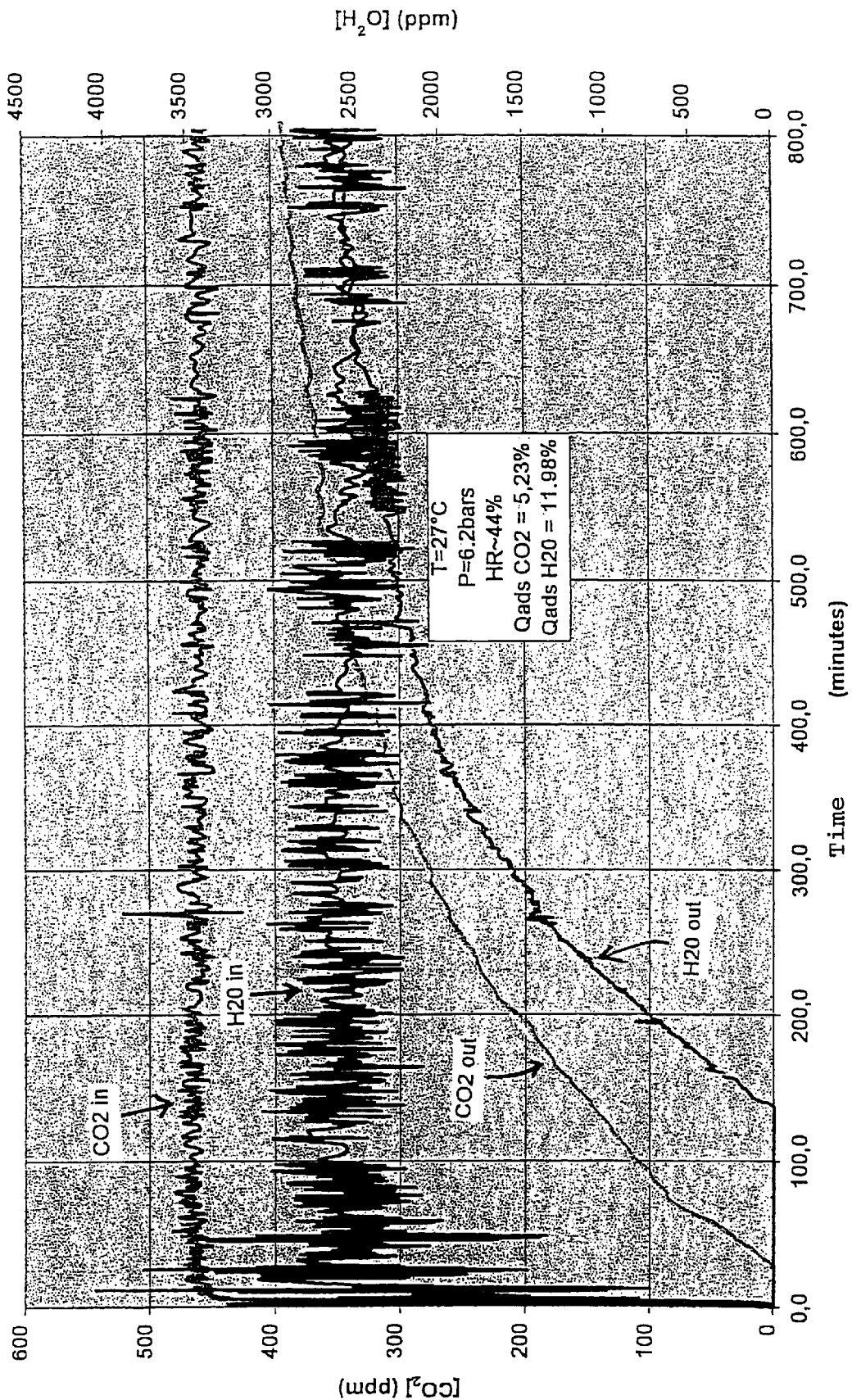

FIGS. 3, 4 and 5 respectively represent the penetration curves, that is to say the curves of co-adsorption of $CO_2$ and water vapour on the following types of adsorbent: uncalcined activated alumina (FIG. 3), calcined alumina containing about 2% of sodium oxide (FIG. 4) and calcined alumina containing about 7% of sodium oxide (FIG. 5).

The measurements were taken under similar conditions, namely at a temperature of 27 to 28° C., an adsorption pressure of 6 to 6.2×10⁵ Pa and a relative humidity of 42 to 50% approximately.

The flow to be purified contains about 450 ppm $CO_2$ ($CO_2$ in) and about 3500 ppm water vapour ($H_2O$ in)

It is apparent in FIG. 3 that the uncalcined activated alumina adsorbs only very little $CO_2$ (curve $CO_2$ out) given that almost immediate penetration of the $CO_2$ is observed, that is to say it is very rapidly found downstream of the adsorption bed, which demonstrates its very low co-adsorption by uncalcined activated alumina.

Conversely, the uncalcined activated alumina makes it possible to retain efficiently the water vapour contained in the flow to be purified (curve $H_2O$ out), since for about 200 minutes it is not detected, then it progressively penetrates until it is no longer retained after about 400 minutes.

The result found from this is that the $CO_2$ adsorption capacity (Qads $CO_2$) of an uncalcined activated alumina is 0.48%, and that its water adsorption capacity (Qads $H_2O$) is about 12.61%.

Similarly, FIGS. 4 and 5 show that, although the water adsorption capacity (Qads $H_2O$) of a calcined alumina according to the invention which, depending on the case, contains 2% or 7% of sodium oxide is substantially equivalent to the water adsorption capacity of an unactivated alumina (FIG. 3), the same is not true as regards the adsorption of $CO_2$ by such a calcined alumina.

Indeed, it is seen in FIGS. 4 and 5 that an alumina containing a sodium oxide can co-adsorb the $CO_2$ present in an airflow at the same time as the water. For a calcined alumina with 2% sodium oxide, a $CO_2$ adsorption capacity of 1.26% and a water adsorption capacity of 10.58% are then obtained, and for an activated alumina with 7% sodium oxide a $CO_2$ adsorption capacity of 5.23% and a water adsorption capacity of 11.98% are obtained.

In other words, a calcined alumina containing an alkali or alkaline-earth metal oxide, such as a sodium oxide, has an adsorption capacity for $CO_2$ which is 3 to 11 times greater than that of a conventional uncalcined activated alumina, this being for a substantially equivalent water adsorption capacity.

It is furthermore found that the $CO_2$ adsorption capacity of an activated alumina increases with the proportion of alkali or alkaline-earth metal oxide which it contains.

It is consequently preferable to use calcined aluminas containing at least 2% and, if possible, at least 4 to 5% approximately of an alkali or alkaline-earth metal oxide such as a sodium oxide.

The purification process according to the invention is preferably of the PSA type when a calcined alumina containing at most 5% of at least one alkali or alkaline-earth metal oxide is employed.

Furthermore, for a calcined alumina containing 1% to 10% approximately, preferably from 4 to 8%, of metal oxide, the process of the invention is advantageously of the TSA type.

Furthermore, in certain cases, it may be desirable also to remove the hydrocarbon impurities which may be present in atmospheric air, for example on a bed of an adsorbent specific to these impurities, such as a bed of zeolite or any other similar suitable adsorbent.

What is claimed is:

1. Process for purifying an air flow containing carbon dioxide ($CO_2$) and water vapour, in which at least some of the $CO_2$ and water vapour impurities are removed by adsorbing said impurities on at least one calcined alumina containing at most 10% by weight of at least one alkali or alkaline-earth metal oxide, said adsorption being carried out at a temperature of between −10° C. and 80° C.

2. Process according to claim 1, characterized in that at least one calcined alumina is obtained by:

a) impregnating an adsorbent based on activated alumina with at least one solution of a salt of at least one alkali or alkaline-earth metal;

b) drying an adsorbent based on impregnated alumina obtained in step a) at a temperature of at least 15° C.;

c) calcining an adsorbent based on dried alumina obtained in step b) at a temperature of at least 120° C.

3. Process according to claim 1, characterized in that at least one alkali or alkaline-earth metal is selected from sodium, potassium, calcium and mixtures thereof.

4. Process according to claim 1, characterized in that the calcined alumina contains from 4 to 10% by weight of alkali or alkaline-earth metal oxide.

5. Process according to claim 1, characterized in that the calcined alumina contains at most 5% by weight of alkali or alkaline-earth metal oxide.

6. Process according to claim 1, characterized in that the calcined alumina particles have a size of between 1 and 5 mm.

7. Process according to claim 1, characterized in that the $CO_2$ and water vapour are removed in at least one adsorber.

8. Process according to claim 1, characterized in that it is selected from the group formed by TSA and PSA processes.

9. Process according to claim 1, characterized in that the operation is carried out at an adsorption pressure of from $10^5$ to $10^7$ Pa.

10. Process according to claim 1, characterized in that it comprises at least one step of cryogenically separating at least some of the purified air.

11. Process according to claim 7, wherein the $CO_2$ and water vapour are removed in at least two adsorbers operating alternately.

12. Process according to claim 10, wherein the step of cryogenically separating at least some of the purified air comprises cryogenically distilling the purified air.

* * * * *